US011264861B2

(12) United States Patent
Takemoto

(10) Patent No.: US 11,264,861 B2
(45) Date of Patent: Mar. 1, 2022

(54) ROTOR CORE FOR ROTATING ELECTRICAL MACHINE

(71) Applicant: TOYOTA BOSHOKU KABUSHIKI KAISHA, Aichi-ken (JP)

(72) Inventor: Masaaki Takemoto, Toyokawa (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 104 days.

(21) Appl. No.: 16/732,600

(22) Filed: Jan. 2, 2020

(65) Prior Publication Data

US 2020/0220422 A1    Jul. 9, 2020

(30) Foreign Application Priority Data

Jan. 8, 2019  (JP) .............................. JP2019-001064

(51) Int. Cl.
*H02K 1/27*    (2006.01)
*H02K 5/22*    (2006.01)
*H02K 1/274*   (2022.01)

(52) U.S. Cl.
CPC ............... *H02K 5/22* (2013.01); *H02K 1/274* (2013.01); *H02K 2201/09* (2013.01); *H02K 2207/00* (2013.01)

(58) Field of Classification Search
CPC ...... H02K 5/22; H02K 1/274; H02K 2201/09; H02K 2207/00; H02K 1/2766; H02K 1/27; H02K 1/276
See application file for complete search history.

(56) References Cited

U.S. PATENT DOCUMENTS

| 2007/0063607 | A1 | 3/2007 | Hattori | |
| 2012/0248920 | A1* | 10/2012 | Takahashi | H02K 1/32 310/156.61 |
| 2016/0380493 | A1* | 12/2016 | Matsumoto | H02K 1/2766 310/156.21 |

FOREIGN PATENT DOCUMENTS

| CN | 1937358 | 3/2007 |
| CN | 205960820 | 2/2017 |
| JP | 2007-236019 | 9/2007 |
| JP | 2008-199698 | 8/2008 |

(Continued)

OTHER PUBLICATIONS

Machine Translation, SANO, JP-2019075930-A, May 2019. (Year: 2019).*

(Continued)

*Primary Examiner* — Thomas Truong
(74) *Attorney, Agent, or Firm* — Greenblum & Bernstein, P.L.C.

(57) ABSTRACT

A rotor core for a rotating electrical machine includes a laminated body that has insertion holes, a permanent magnet accommodated inside each of the insertion holes and fixed to the laminated body, and an end plate arranged at an end of the laminated body in the rotation axis direction. The laminated body includes annular flat metal plates that are stacked. A circumferential edge of the end plate is welded and fixed to circumferential edges of the metal plates such that the end plate is arranged at an end of the laminated body in the rotation axis direction to close openings of the insertion holes. A through-hole extends through an outer edge portion of at least one of an outermost metal plate of the laminated body or the end plate.

4 Claims, 5 Drawing Sheets

(56) References Cited

FOREIGN PATENT DOCUMENTS

JP          2019075930  A   *   5/2019

OTHER PUBLICATIONS

Official Action, China Patent Office, in counterpart Chinese Patent Application No. 201911414089.5, dated Oct. 29, 2021 (with English translation).

* cited by examiner

ROTOR CORE FOR ROTATING ELECTRICAL MACHINE

BACKGROUND

1. Field

The present disclosure relates to a rotor core for a rotating electrical machine.

2. Description of Related Art

A known rotor core for a rotating electrical machine is of a magnet-embedded type (refer to Japanese Laid-Open Patent Publication No. 2007-236019). This rotor core includes a laminated body configured by stacking annular flat metal plates. The laminated body includes insertion holes arranged at intervals in the circumferential direction of the rotor core. Permanent magnets are inserted into the insertion holes and fixed to the laminated body.

The rotor core also includes two end plates formed by annular flat metal plates. The end plates are arranged at the opposite ends of the laminated body in the stacking direction so that openings of the insertion holes of the laminated body are closed. In the rotor core described in the above publication, the circumferential edges of the metal plates of the laminated body and the circumferential edges of the end plates are joined (fixed) to each other by welding.

In a rotor core described in Japanese Laid-Open Patent Publication No. 2008-199698, metal plates (such as magnetic steel plates) of a laminated body and end plates (such as aluminum plates) are made of materials that have different linear expansion coefficients.

A rotor core in which metal plates of a laminated body and end plates are made of materials that have different linear expansion coefficients may have the following disadvantages if the laminated body and the end plates are joined by welding. Specifically, a rise in the temperature of the rotor core during operation of the rotating electrical machine causes a difference between the amount of thermal expansion of the laminated body and the amount of thermal expansion of the end plates. This difference will lead to internal stress produced at a portion where the laminated body and the end plates are welded. This internal stress may decrease the welding strength of the welding portion.

SUMMARY

It is an objective of the present disclosure to provide a rotor core for a rotating electrical machine that restricts a decrease in a welding strength between a laminated body and end plates.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a rotor core for a rotating electrical machine that achieves the object includes a laminated body including a plurality of annular flat metal plates that are stacked, in which the laminated body includes a plurality of insertion holes extending through the laminated body in a rotation axis direction that is parallel to a rotation axis of the rotor core, and the insertion holes are arranged at intervals in a circumferential direction of the metal plates, a permanent magnet accommodated inside each of the insertion holes and fixed to the laminated body, and an annular flat end plate made of a metal material different from the metal plates, in which a circumferential edge of the end plate is welded and fixed to circumferential edges of the metal plates such that the end plate is arranged at an end of the laminated body in the rotation axis direction to close openings of the insertion holes. A through-hole extends through an outer edge portion of at least one of an outermost metal plate of the laminated body or the end plate adjacent to the outermost metal plate.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A rotor core 11 for a rotating electrical machine according to one embodiment will now be described with reference to FIGS. 1 to 5. In the present embodiment, the rotating electrical machine is an electric motor.

First, the overall structure of a rotor 10 to which the rotor core 11 according to the present embodiment is applied will be described.

Figure 1:
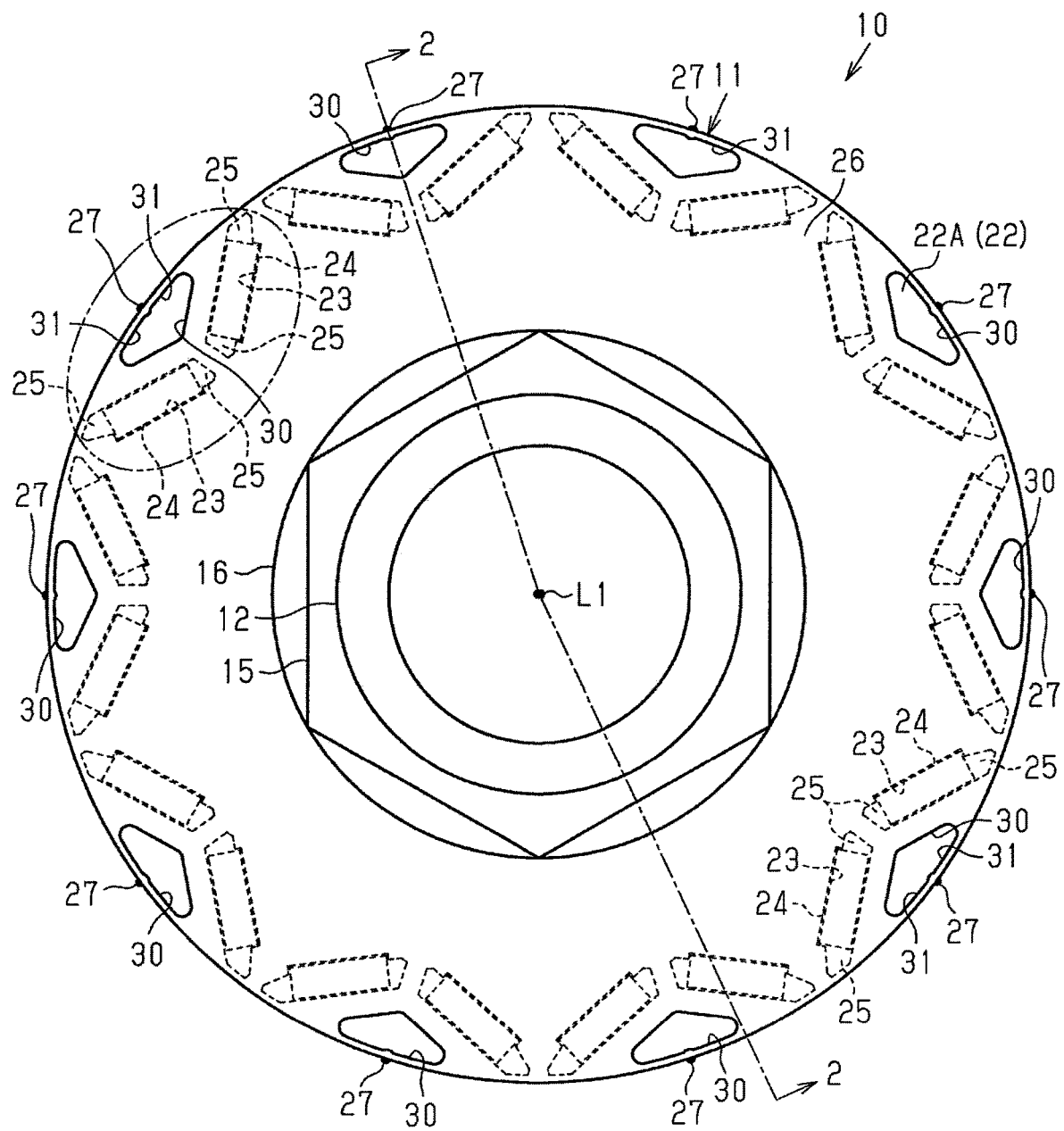
FIG. 1 is a side view of a rotor to which a rotor core for a rotating electrical machine according to one embodiment is applied.
Figure 2:
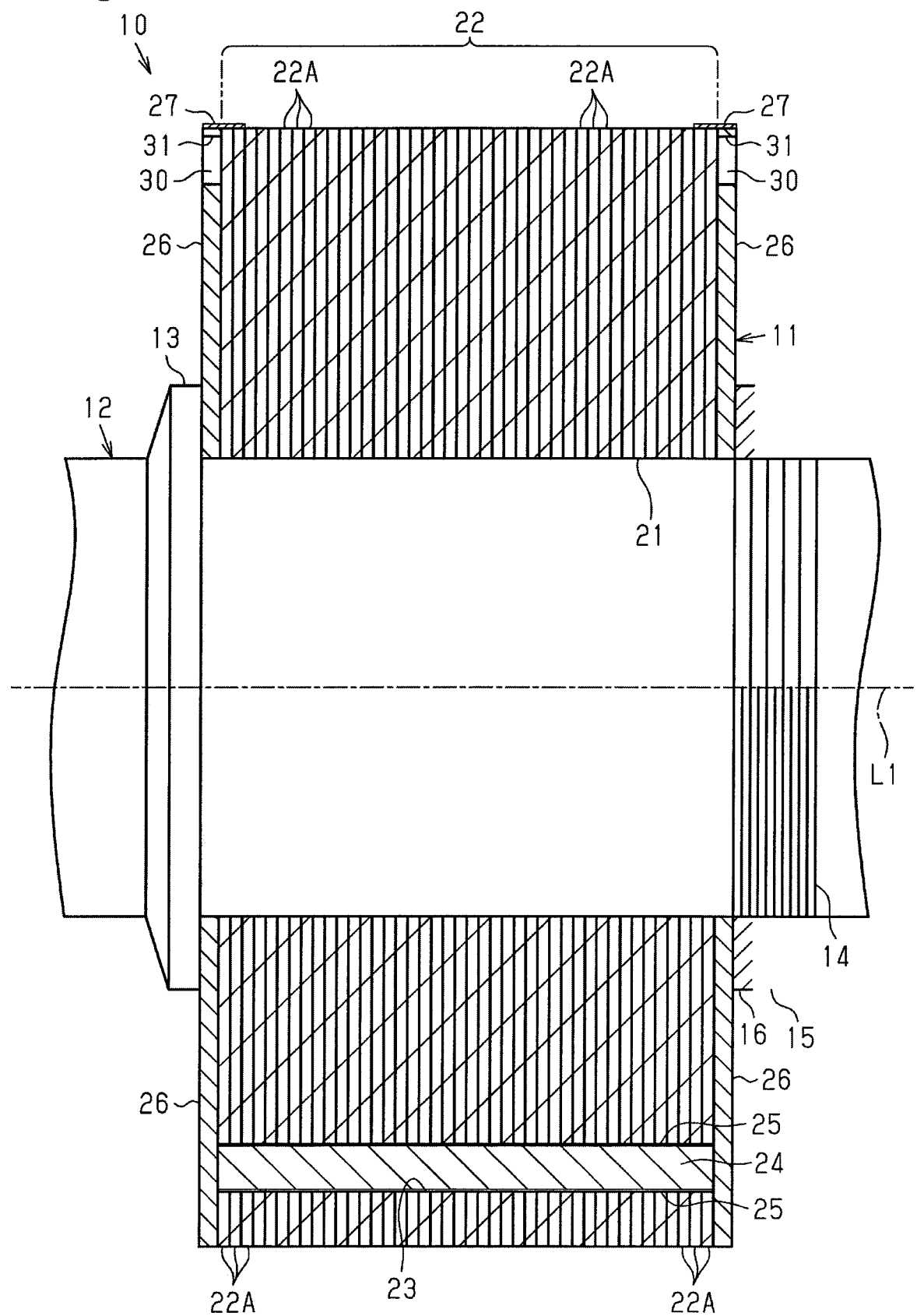
FIG. 2 is a cross-sectional view of the rotor taken along line 2-2 in FIG. 1.
Figure 3:
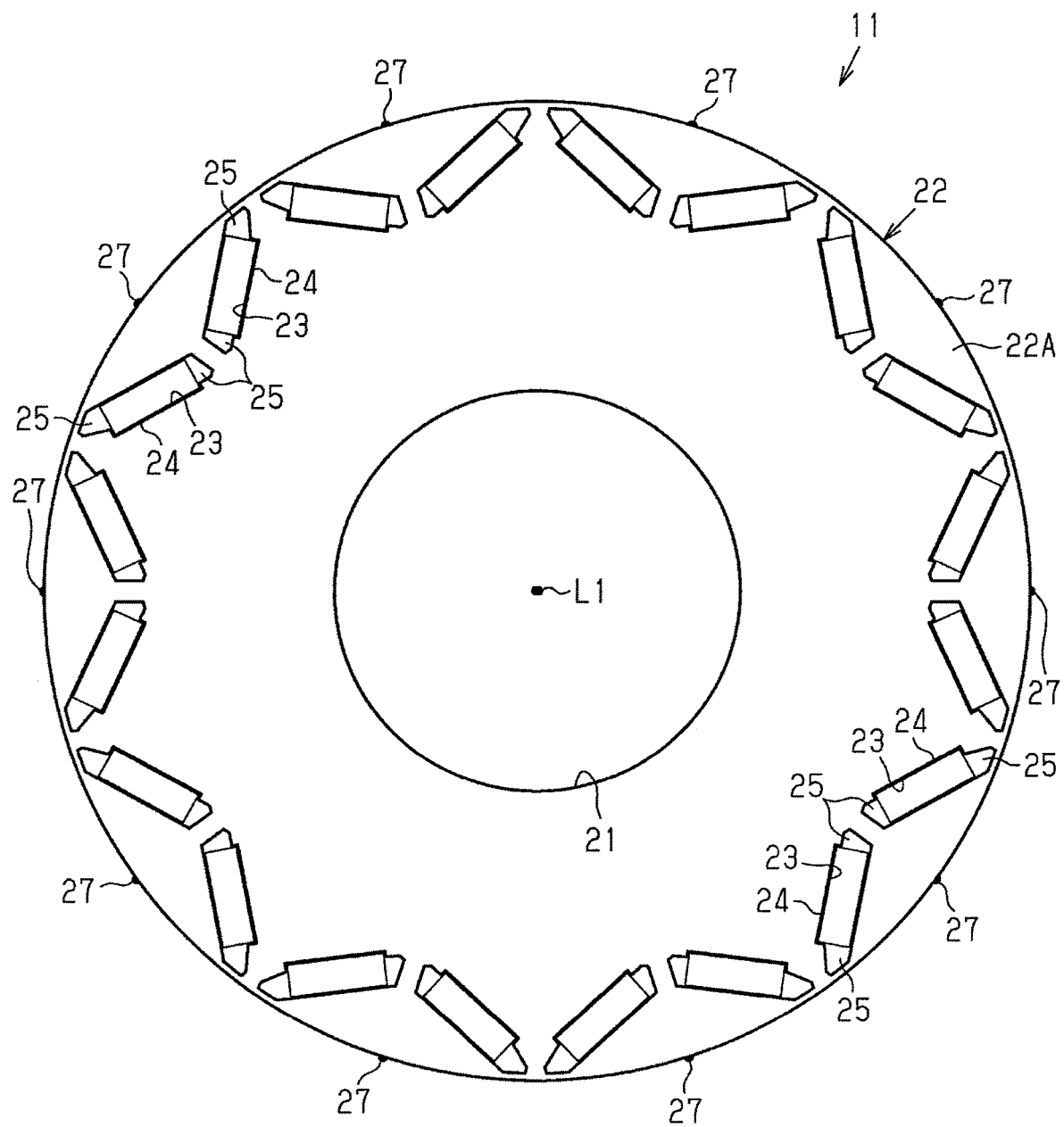
FIG. 3 is a side view of the rotor core.

As shown in FIGS. 1 and 2, the rotor 10 includes the cylindrical rotor core 11 and a rotor shaft 12 that is inserted into a central hole 21 (FIG. 2) of the rotor core 11 and fixed to the rotor core 11.

The rotor core 11 includes a laminated body 22 configured by stacking annular flat metal plates 22A. The metal plates 22A are each formed by an electromagnetic steel plate made of a magnetic material. In the laminated body 22, insertion holes 23 are arranged at intervals in the circumferential direction of the laminated body 22. The insertion holes 23 extend through the laminated body 22 in a rotation axis direction (right-left direction in FIG. 2) that is parallel to rotation axis L1 of the rotor core 11. Specifically, the laminated body 22 includes a total of ten pairs of insertion holes 23, which are adjacent to each other in the circumferential direction. The insertion holes 23 each have an elongated cross section. The two insertion holes 23 of each pair extend outward as they approach each other.

A permanent magnet 24 is inserted into and accommodated in each insertion hole 23. The permanent magnet 24 has a long rectangular cross section in the longitudinal direction of the cross section of the insertion hole 23. The permanent magnet 24 is fixed to the laminated body 22 (i.e., inner surface of insertion hole 23) with a filler 25 made of a thermosetting epoxy resin. In general, the magnetic poles of an electric motor are each formed by two permanent magnets 24 that are inserted into and fixed to two insertion holes 23 that are circled with the long dashed double-short dashed line in FIG. 1, specifically two insertion holes 23 that are located inward as they approach each other.

The rotor core 11 includes two annular flat end plates 26. The end plates 26 are made of a metal material different from the metal plates 22A. Specifically, the end plates 26 are made of stainless steel, which is a non-magnetic material. The end plates 26 are arranged at the opposite ends of the laminated body 22 in the rotation axis direction so that openings of the insertion holes 23 are closed. The rotor core 11 is configured by stacking the metal plates 22A and the two end plates 26. The two end plates 26 form the outermost layers in the stacking direction.

In the rotor core 11, the circumferential edges of the end plates 26 and the circumferential edges of the metal plates 22A are joined to each other by welding so that the end plates 26 are fixed to the laminated body 22. A welding portion 27 for welding and fixing is set at a location between the two permanent magnets 24 that form the magnetic pole. The rotor core 11 includes such welding portions 27 set at ten locations for the corresponding magnetic poles.

As shown in FIG. 2, the rotor shaft 12 includes an annular flange 13 that projects from its circumference. An external thread 14 is provided to a portion on the outer surface of the rotor shaft 12 that is spaced apart from the flange 13. A nut 15 is threaded onto the external thread 14. When the rotor core 11 is coupled to the rotor shaft 12, the rotor shaft 12 is inserted into the central hole 21 of the rotor core 11. Then, while the rotor core 11 is held between the flange 13 of the rotor shaft 12 and the nut 15 (washer 16), the nut 15 is threaded onto the external thread 14 of the rotor shaft 12. The rotor core 11 is fixed to the rotor shaft 12 in this manner.

In the rotor core 11 according to the present embodiment, the metal plates 22A formed by electromagnetic steel plates in the laminated body 22 and the end plates 26 formed by stainless steel plates are made of materials that have different linear expansion coefficients and joined by welding. Thus, when the temperature of the rotor core 11 rises during operation of the electric motor, a difference between the amount of thermal expansion of the laminated body 22 and the amount of thermal expansion of the end plates 26 may produce internal stress at the welding portion 27. This may decrease the welding strength of the welding portions 27.

In view of this, the rotor core 11 according to the present embodiment includes through-holes 30 extending through the end plates 26 in order to restrict a decrease in the welding strength at the welding portions 27. The through-holes 30 will now be described.

Figure 4:
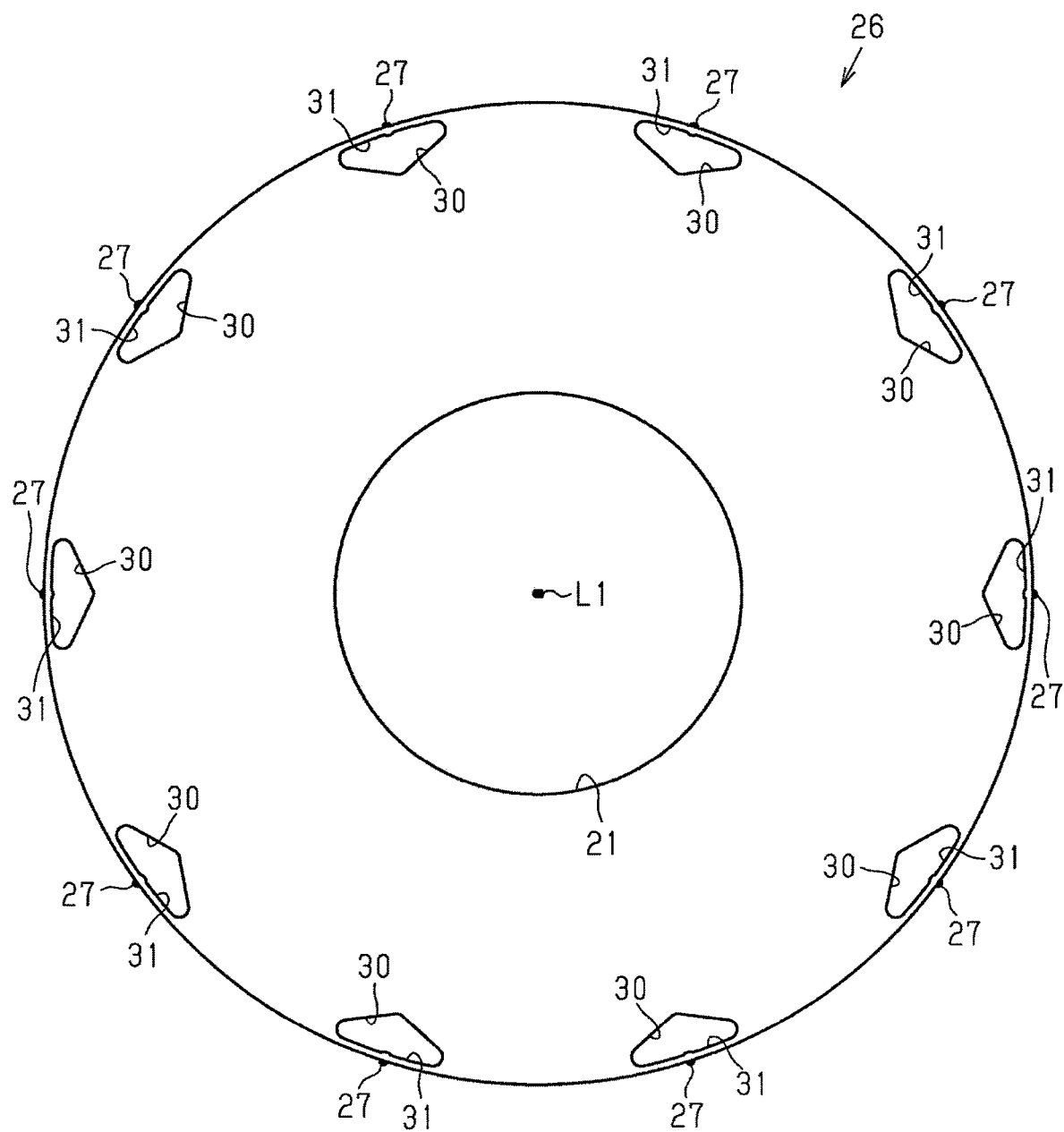
FIG. 4 is a side view of an end plate.
Figure 5:
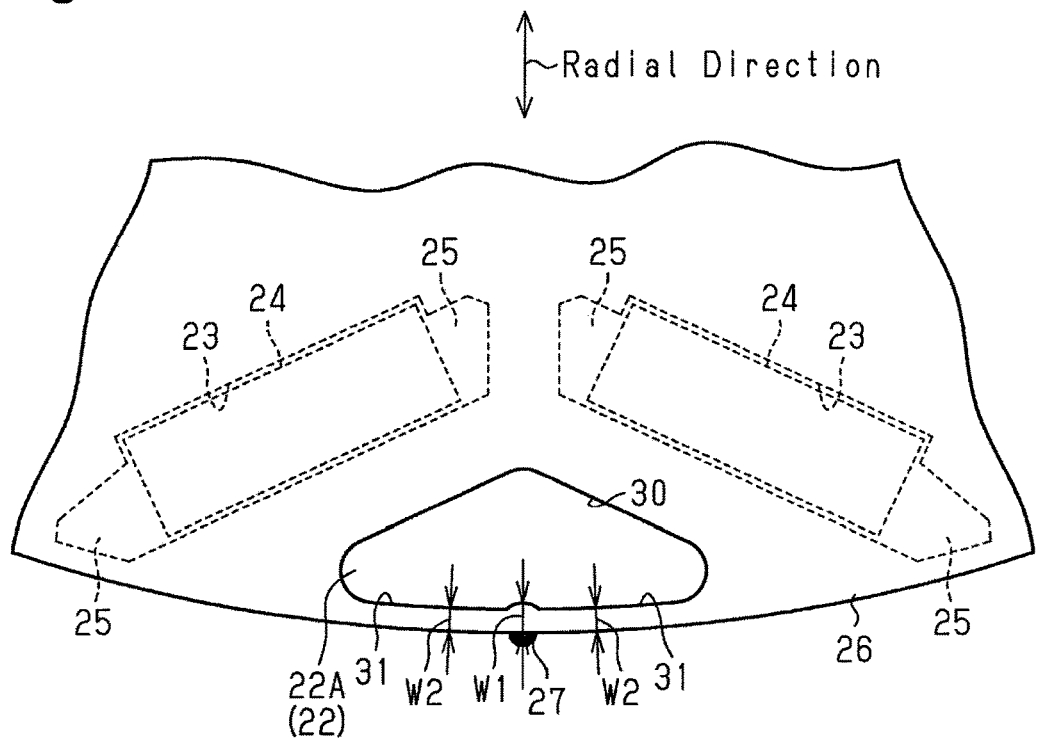
FIG. 5 is an enlarged side view of a welding portion of a rotor core and its periphery.

As shown in FIGS. 1, 4, and 5, plural (ten in the present embodiment) through-holes 30 extend through an outer edge portion of the end plate 26. The through-holes 30 are each arranged between the welding portions 27 and rotation axis L1. Specifically, the through-holes 30 are each formed at a location between an arrangement portion where the two permanent magnets 24 that form a magnetic pole are arranged and the corresponding welding portion 27 arranged outward from the arrangement portion in the radial direction of the rotor core 11. The outer circumferential end of the through-hole 30 (lower side in FIG. 5) is arcuate and extends along the circumferential edge of the end plate 26. Further, the inner circumferential end of the through-hole 30 (upper side in FIG. 5) extends in parallel with the outer surfaces of the two permanent magnets 24 and is curve-shaped to have a projection that projects inward.

The through-hole 30 is arranged in this manner to form a bridge 31 at a location adjacent to the welding portion 27 in the end plate 26. The bridge 31 is band-shaped between the circumferential edge of the end plate 26 and the outer circumferential end of the through-hole 30. The bridge 31 forms the end of the outer edge portion of the end plate 26. The bridge 31 is arcuate and extends in the outer edge portion. In the bridge 31, the width (indicated by W1 in FIG. 5) of a portion close to the welding portion 27 is greater than the width (indicated by W2 in FIG. 5) of a portion located away from the welding portion 27.

The rotor core 11 according to the present embodiment achieves the following advantages.

(1) The rotor core 11 according to the present embodiment includes the through-holes 30 at locations close to the welding portions 27 in the outer edge portion of the end plates 26. This forms the band-shaped bridges 31 having lower rigidity at locations adjacent to the welding portions 27 in the end plates 26. Thus, when a rise in the temperature of the rotor core 11 during operation of the electric motor causes a difference between the amount of thermal expansion of the laminated body 22 and the amount of thermal expansion of the end plates 26 and thus produces a force that shifts the circumferential edges of the end plates 26 and the circumferential edge of the laminated body 22 in the radial direction, the bridges 31 are warped in the radial direction.

The bridges 31 of the end plates 26 are deformed to offset part of the force acting on the welding portions 27 so that the force acting on the welding portions 27 is reduced as compared with a structure in which the through-holes 30 are not included. This reduces internal stress produced at the welding portions 27 of the laminated body 22 and the end plates 26 and restricts a decrease in the welding strength between the laminated body 22 and the end plates 26.

(2) The rotor core 11 includes the through-holes 30 at locations between the welding portions 27 in the end plates 26 and rotation axis L1. This reduces the rigidity of the periphery of the welding portions 27 in the end plates 26 so that the periphery of the welding portions 27 is easily deformed.

(3) The rotor core 11 includes the band-shaped bridges 31 at locations adjacent to the welding portions 27 in the end plates 26. The bridges 31 are easily deformed. The bridges 31 are deformed to reduce internal stress produced at the welding portions 27.

(4) The bridge 31 forms the end of the outer edge portion of the end plate 26 and extends in the outer edge portion. In the bridge 31, the width of a portion close to the welding portion 27 is greater than the width of a portion located away from the welding portion 27. This reduces the width of the portion in the bridge 31 located away from the welding portion 27 for easy deformation. The portion located away from the welding portion 27 is deformed so that the total amount of deformation in the bridge 31 is ensured. In addition, the width of the portion close to the welding portion 27 in the bridge 31 is increased so that the portion is relatively less likely to be deformed. This restricts warping deformation and twisting deformation at the portion close to the welding portion 27 and thus reduces internal stress at the welding portion 27 that may result from the warping deformation and the twisting deformation. This restricts a decrease in the welding strength between the laminated body 22 and the end plates 26 in a preferred manner.

The above embodiments may be modified as follows.

The metal plates 22A of the laminated body 22 may be metal plates other than electromagnetic steel plates such as metal plates made of iron or an iron alloy. The metal plates of the end plates 26 may be metal plates other than stainless steel plates such as metal plates made of an aluminum alloy.

Figure 6:
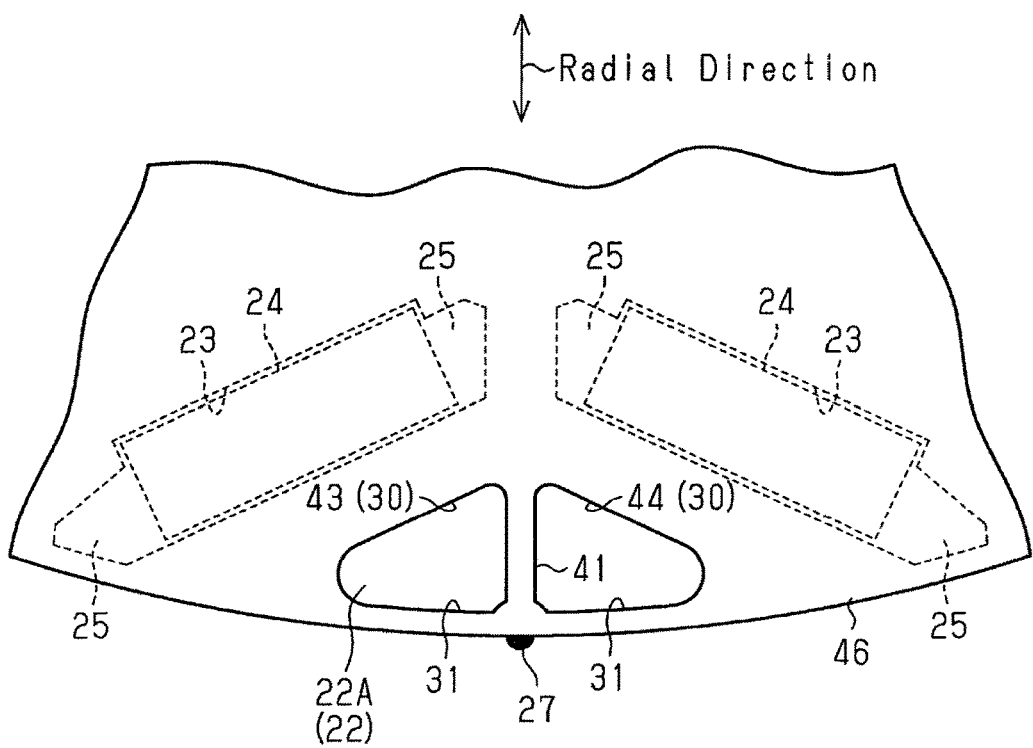
FIG. 6 is an enlarged side view of a welding portion of a rotor core and its periphery according to another embodiment.

Through-holes may be arranged at the portion close to the welding portion 27 in an end plate 46. FIG. 6 shows an example of such a rotor core. In the example shown in FIG. 6, a band-shaped auxiliary bridge 41 that extends in a straight line connecting the welding portion 27 and rotation axis L1 is arranged between the inner circumferential end and the outer circumferential end of the through-hole 30 (refer to FIG. 5). This partitions the opening of the through-hole 30 so that the through-hole 30 is divided into two through-holes 43, 44 arranged in the circumferential direction. With this structure, the auxiliary bridge 41 may be used as a deformation portion that is deformed by force resulted from a difference between the amount of thermal expansion of the end plate 46 and the amount of thermal expansion of the metal plate 22A or a reinforcement portion that restricts deformation of the bridge 31 caused by the force. Thus, the rigidity of the portion close to the welding portion 27 in the end plate 46 will be freely determined. In the example shown in FIG. 6, one of the two through-holes 43, 44 may be omitted.

The widths of portions the bridge 31 may be changed. For example, the width of the portion close to the welding portion 27 and the width of the portion located away from the welding portion 27 in the bridge 31 may be the same.

In addition to or in place of the through-holes arranged in the end plates 26 to restrict a decrease in the welding strength between the laminated body 22 and the end plates 26, through-holes may be arranged in the outermost metal plates 22A among the metal plates 22A of the laminated body 22 that are adjacent to the end plates 26. In this case, the through-holes may extend through the metal plates 22A including the outermost metal plates 22A.

Preferably, the through-holes are arranged in the end plates 26 rather than the metal plates 22A of the laminated body 22. When the through-holes are arranged in the metal plates 22A of the laminated body 22, if locations where the through-holes are arranged overlap with locations where the permanent magnets 24 are arranged in the radial direction, this may deteriorate the performance of the rotor core 11 and thereby deteriorates the performance of the electric motor. In view of this, the through-holes are arranged only in the end plates 26 among the metal plates 22A and the end plates 26 as described above so that the locations where the through-holes are arranged do not overlap with the locations where the permanent magnets 24 are arranged in the radial direction. This restricts deterioration of the performance of the rotor core 11 caused by through-holes as compared with through-holes arranged in the metal plates 22 of the laminated body 22.

In the rotor core 11, if the ends of the insertion holes 23 in the rotation axis direction that is parallel to rotation axis L1 are filled with only the filler 25 without the permanent magnets 24, through-holes may be arranged at the ends to restrict deterioration of the performance of the rotor core 11.

The rotor core according to the embodiment is not limited to a rotor having ten magnetic poles (five magnetic pole pairs) and may be applied to a rotor having any number of magnetic poles (four, six, eight, or the like).

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A rotor core for a rotating electrical machine, the rotor core comprising:
   a laminated body including a plurality of annular flat metal plates that are stacked, wherein the laminated body includes a plurality of insertion holes extending through the laminated body in a rotation axis direction that is parallel to a rotation axis of the rotor core, and the insertion holes are arranged at intervals in a circumferential direction of the metal plates;
   a permanent magnet accommodated inside each of the insertion holes and fixed to the laminated body; and
   an annular flat end plate made of a metal material different from the metal plates, wherein a circumferential edge of the end plate is welded and fixed to circumferential edges of the metal plates at one or more welding portion such that the end plate is arranged at an end of the laminated body in the rotation axis direction to close openings of the insertion holes,
   wherein a through-hole extends through an outer edge portion of at least one of an outermost metal plate of the laminated body or the end plate adjacent to the outermost metal plate, and
   wherein the through-hole is located between the rotation axis and the welding portion that is welded and fixed.

2. The rotor core for a rotating electrical machine according to claim 1, wherein the through-hole is not arranged in the outermost metal plate and is arranged in the end plate.

3. A rotor core for a rotating electrical machine, the rotor core comprising:
   a laminated body including a plurality of annular flat metal plates that are stacked, wherein the laminated body includes a plurality of insertion holes extending through the laminated body in a rotation axis direction that is parallel to a rotation axis of the rotor core, and the insertion holes are arranged at intervals in a circumferential direction of the metal plates;
   a permanent magnet accommodated inside each of the insertion holes and fixed to the laminated body; and
   an annular flat end plate made of a metal material different from the metal plates, wherein a circumferential edge of the end plate is welded and fixed to circumferential edges of the metal plates at one or more welding portion such that the end plate is arranged at an end of the laminated body in the rotation axis direction to close openings of the insertion holes, wherein a through-hole extends through an outer edge portion of at least one of an outermost metal plate of the laminated body or the end plate adjacent to the outermost metal plate, and wherein the through-hole is arranged to form a band-shaped bridge at a location adjacent to the welding portion that is welded and fixed.

4. A rotor core for a rotating electrical machine, the rotor core comprising:

a laminated body including a plurality of annular flat metal plates that are stacked, wherein the laminated body includes a plurality of insertion holes extending through the laminated body in a rotation axis direction that is parallel to a rotation axis of the rotor core, and the insertion holes are arranged at intervals in a circumferential direction of the metal plates;

a permanent magnet accommodated inside each of the insertion holes and fixed to the laminated body; and an annular flat end plate made of a metal material different from the metal plates, wherein a circumferential edge of the end plate is welded and fixed to circumferential edges of the metal plates at one or more welding portion such that the end plate is arranged at an end of the laminated body in the rotation axis direction to close openings of the insertion holes, wherein a through-hole extends through an outer edge portion of at least one of an outermost metal plate of the laminated body or the end plate adjacent to the outermost metal plate, wherein the through-hole is arranged to form a band-shaped bridge at a location adjacent to the welding portion that is welded and fixed, and wherein the bridge forms an end of the outer edge portion and extends along the outer edge portion, and a width of a portion adjacent to the welding portion is greater than a width of a portion located away from the welding portion.

* * * * *